L. F. McKELVEY AND J. A. BRANDENBURGER.
PHOTOFILM CLIP.
APPLICATION FILED MAY 22, 1919.
1,329,422.
Patented Feb. 3, 1920.
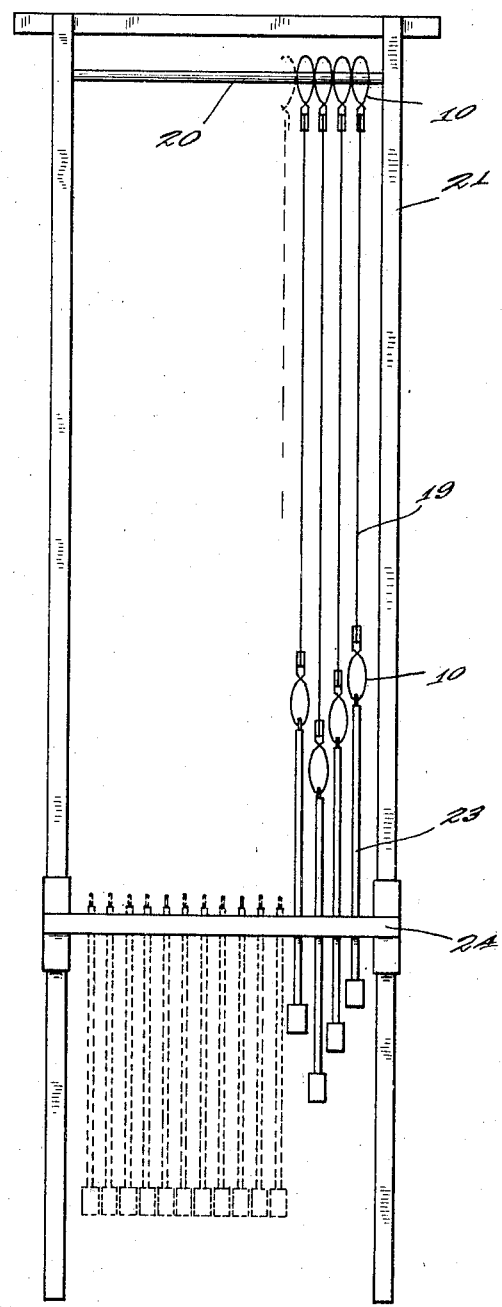
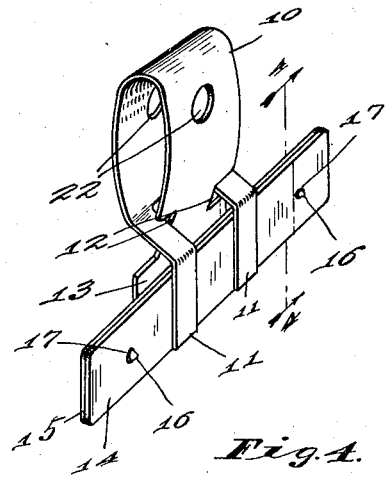
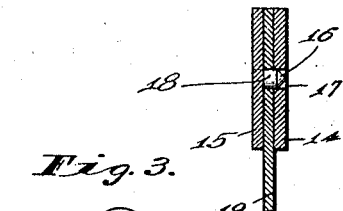
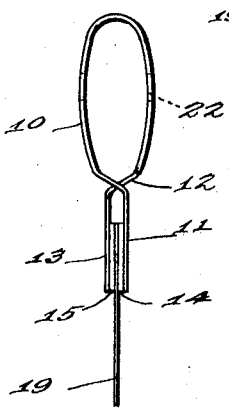
Witness
Frank A. Fahle
Inventors
Louis F. McKelvey
John A. Brandenburger,
By Hood&Schley, Attorneys

UNITED STATES PATENT OFFICE.

LOUIS F. McKELVEY AND JOHN A. BRANDENBURGER, OF INDIANAPOLIS, INDIANA.

PHOTOFILM-CLIP.

1,329,422.　　　　　　　Specification of Letters Patent.　　　Patented Feb. 3, 1920.

Application filed May 22, 1919. Serial No. 298,989.

*To all whom it may concern:*

Be it known that we, LOUIS F. McKELVEY and JOHN A. BRANDENBURGER, citizens of the United States, residing at Indianapolis, in the county of Marion and State of Indiana, have invented a new and useful Photofilm-Clip, of which the following is a specification.

It is the object of our invention to produce a photo-film clip which will hold photo films securely even when the clip and film are immersed in the film-treating baths, in which many films are frequently lost and spoiled by slipping from the film holders carrying them, and also even when the film is under tension between two clips in order to keep the film taut and prevent it from engaging other films which may be adjacent; and which will space the film carried by it from films carried by adjacent similar clips.

The accompanying drawing illustrates our invention. Figure 1 is an elevation of a photo-film carrier equipped with photo-film clips of our invention, showing the carrier supporting a plurality of films spaced apart by the abutting of the clips; Fig. 2 is a perspective view of a photo-film clip embodying our invention; Fig. 3 is an end elevation of said photo-film carrier, with a portion of a film therein; and Fig. 4 is an enlarged section on the line 4—4 of Fig. 2, also showing a portion of a film in place in the clip.

Our photo clip has a spring carrying member 10, which is made of spring sheet metal and is folded on itself to provide a loop, with the free ends crossing, one free end being bifurcated to provide a pair of fingers 11 and the other being provided near the end with lateral notches 12 for permitting the passage of the fingers 11, the latter end having a single finger 13 opposing the two fingers 11. Two flat sheet-metal plates 14 and 15 are fastened to the adjacent faces of the fingers 11 and of the finger 13 respectively, in any suitable manner, as by riveting, brazing, or soldering. These plates 14 and 15 form the jaws of the clip, and preferably are of considerable length, projecting on both sides of the fingers 11 and 13. One of these jaws, say 15, is provided on its face toward the other jaw with a plurality of projecting pins 16; and said other jaw is provided with a similar number of holes 17 which register with pins 16. The pins 16 are suitably fastened to their supporting jaw 15, as by being soldered thereto. Each of these pins is preferably pointed; but the taper leading to the point does not extend all the way to the face of the supporting jaw 15, but stops short thereof, to provide an untapered surface 18 at least as long as the thickness of the photographic film. The spring of the carrying member 10 tends to move the jaws 14 and 15 together; and when a film 19 is placed between such jaws this spring tends to move such jaws into engagement with the film and force the pins 16 through the film to perforate it. Of course, this will be done near the end of the film. The tapered parts of the pins 16 pass completely through the film and force the film on to the untapered parts of the pins. As a result, a pull on the film 19 acts on the untapered surfaces 18, which thus form shoulders perpendicular to the pull; so that there is no tendency to spread apart the jaws 14 and 15 by the reaction of the film on the jaws, and the film is held firmly in place. Indeed, if the pull is great enough, the film will tear but it will not slip on the pins without tearing no matter what tension is applied. Thus the film is firmly held, even though the clip and film are immersed in film-treating liquids, such as the developing, fixing, and washing baths.

In operation, a film to be developed has its two ends fastened in two clips of our invention, which clips perforate the film as they grip it. The clip at one end of the film may be threaded on to a cross-rod 20 removably mounted at the upper end of a photo-film carrier 21, the carrying member 10 of the film conveniently being provided with perforations 22 for receiving such removable cross-rod 20; while the clip at the other end of the film is suitably attached to one of a series of vertically slidable weight rods 23 carried by a vertically adjustable lower cross-rod 24 of said film carrier, so that the weight of the weight rod 23 tends to hold the film 19 taut so that such film will not come into contact with its neighboring films in the film carrier. This film carrier forms the subject matter of our co-pending application Serial No. 298,990, of even filing date herewith. The loops of the carrying member 10 are of sufficient width so that when a plurality of the clips are threaded onto the cross-rod 20 such loops of adjacent clips abut against each other and so serve to space apart the films carried by such clips so that such films will not engage and stick to one another. To get this spacing effect the loop of the carrying member of such clip is preferably materially wider than the total thickness of the jaw portions, and projects laterally on both sides of the plane of the film held between the jaws.

We claim as our invention:

1. A photo-film clip, comprising a spring member looped upon itself so that its ends cross and project beyond the crossing point to provide suitable abutting jaws, the spring of said member tending to move said jaws together, one of said jaws being provided with pins projecting toward the other and the latter being provided with holes registering with said pins, said pins being provided adjacent to their supporting jaws with portions substantially perpendicular to the face of said supporting jaw and having end portions which alone are tapered, to provide points at the ends.

2. A photo-film clip, comprising a pair of jaws spring-pressed into engagement with each other and manually separable, one of said jaws being provided with pins projecting toward the other and the latter being provided with holes registering with said pins, said pins being provided adjacent to the jaw which carries them with portions substantially perpendicular to the face of said jaw and having end portions which alone are tapered, to provide points at the ends.

3. A photo-film clip, comprising a pair of jaws spring-pressed into engagement with each other and manually separable, one of said jaws being provided with pins projecting toward the other and the latter being provided with holes registering with said pins, said pins being arranged to perforate material clamped between the jaws and being provided with shoulders transverse to the meeting plane of said two jaws so that the material held between said jaws and perforated by said pins will when under tension engage such shoulders and produce no component of force tending to separate the jaws.

4. A photo-film clip, comprising a spring member made of spring sheet metal and looped upon itself so that its ends cross and project beyond the crossing point to provide suitable abutting jaws, the spring of said member tending to move said jaws together, said loop portion being provided with transverse openings so that it may be mounted on a supporting rod and being of greater dimension in the direction of such openings than the combined thickness of said jaws so that when mounted on a rod with a plurality of similar clips it engages the adjacent clips to space apart films carried by it and the adjacent clips, said jaws being provided with means for perforating a film held between them to prevent such film from slipping from between said jaws.

5. A photo-film clip, comprising a spring member made of spring sheet metal and looped upon itself so that its ends cross and project beyond the crossing point to provide suitable abutting jaws, the spring of said member tending to move said jaws together, said loop portion being provided with transverse openings so that it may be mounted on a supporting rod and being of greater dimension in the direction of such openings than the combined thickness of said jaws so that when mounted on a rod with a plurality of similar clips it engages the adjacent clips to space apart films carried by it and the adjacent clips.

In witness whereof we have hereunto set our hands at Indianapolis, Indiana, this first day of May, A. D. one thousand nine hundred and nineteen.

LOUIS F. McKELVEY.
JOHN A. BRANDENBURGER.